March 16, 1965 R. P. HUMPHREY 3,173,378
MECHANICAL ENERGY TRANSDUCING DEVICE
Filed Dec. 2, 1960 4 Sheets-Sheet 1
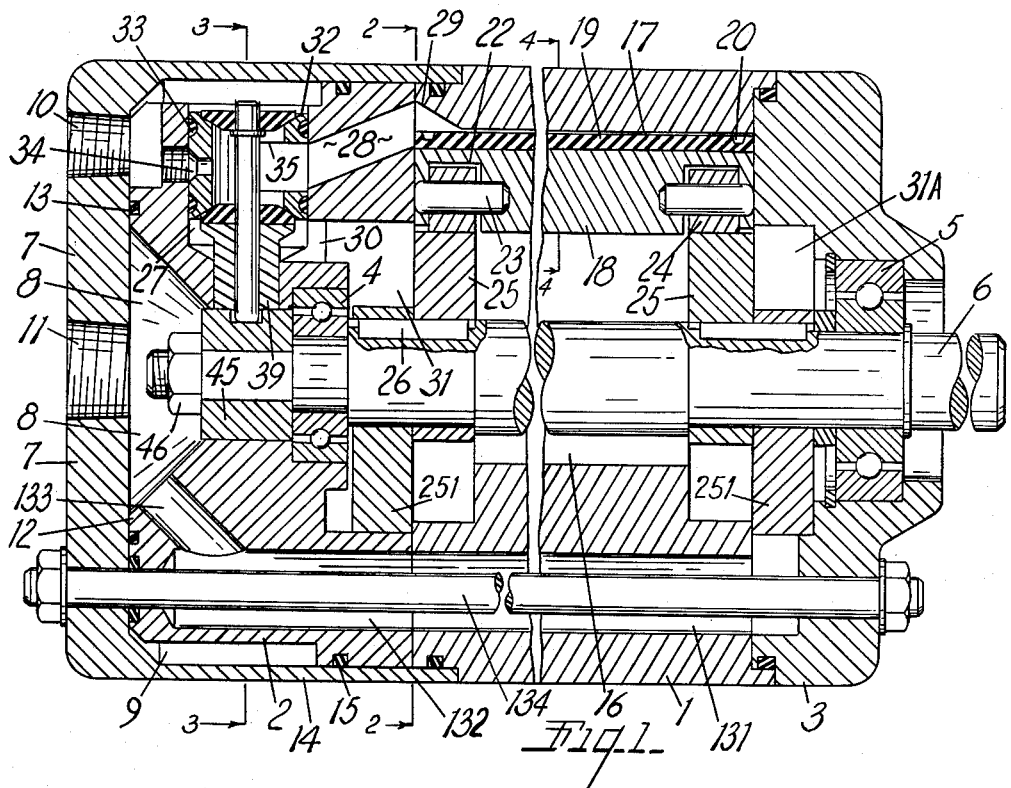
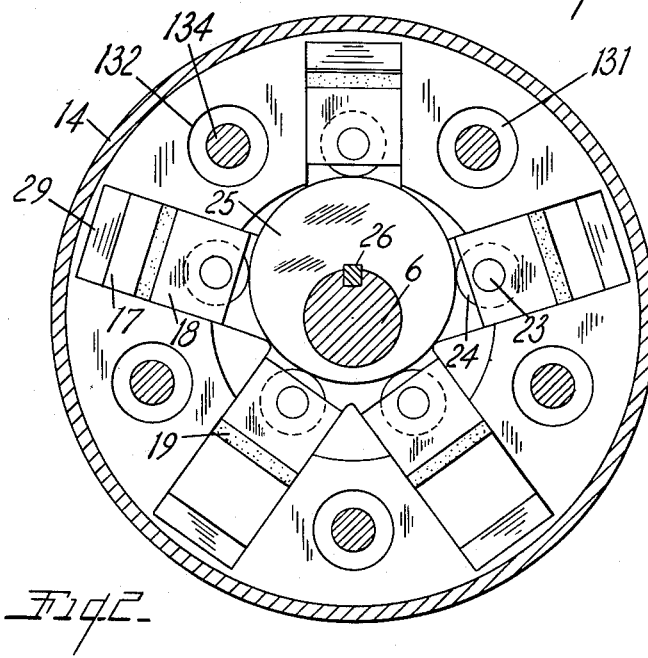
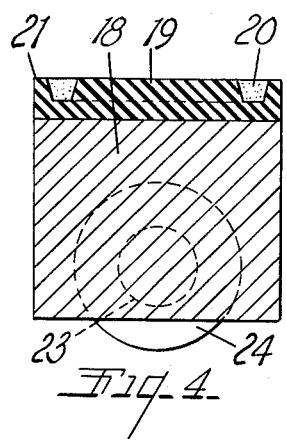
INVENTOR.
Robert P. Humphrey
BY
ATTORNEY March 16, 1965 R. P. HUMPHREY 3,173,378
MECHANICAL ENERGY TRANSDUCING DEVICE
Filed Dec. 2, 1960 4 Sheets-Sheet 2
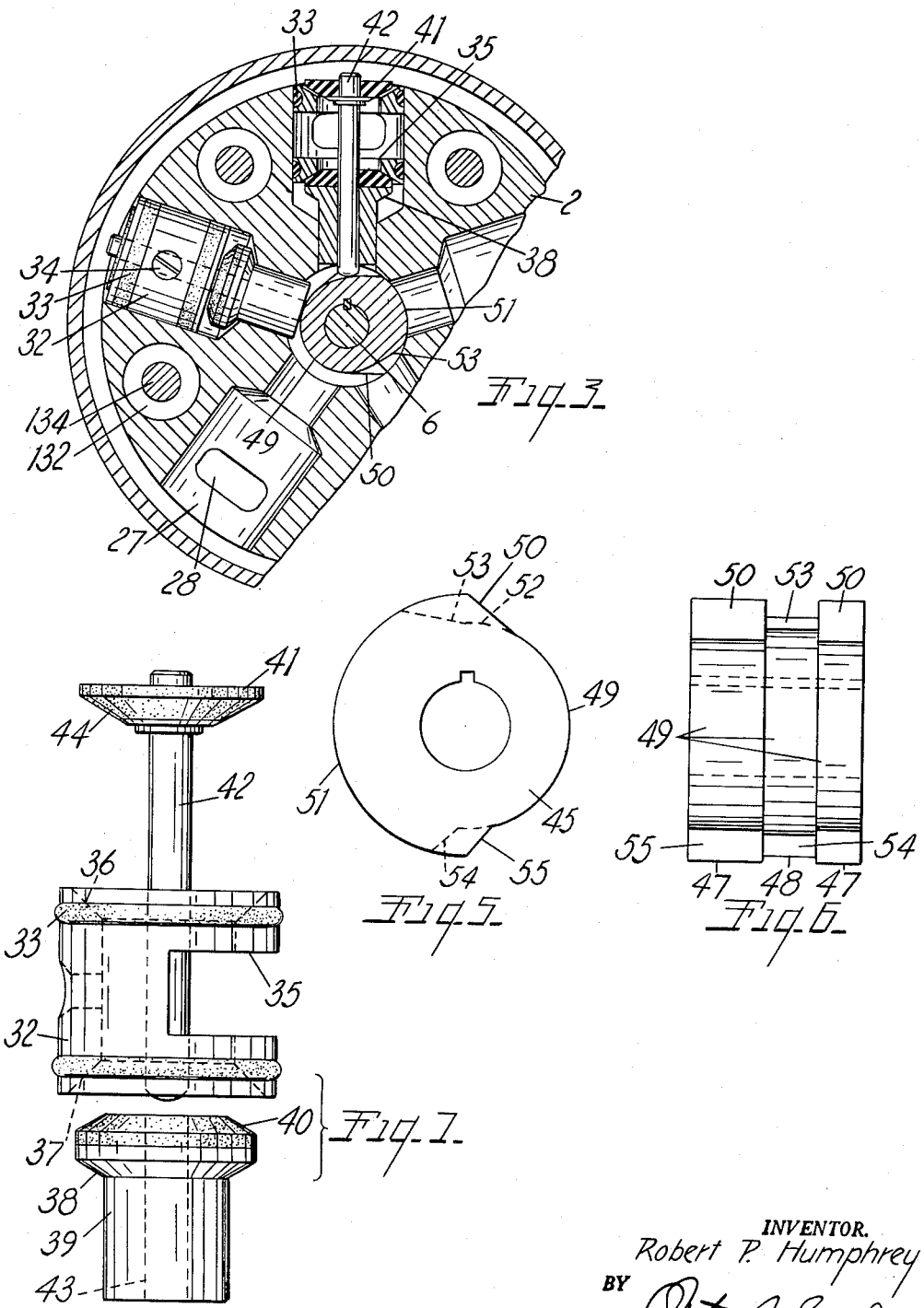
INVENTOR.
Robert P. Humphrey
BY
ATTORNEY

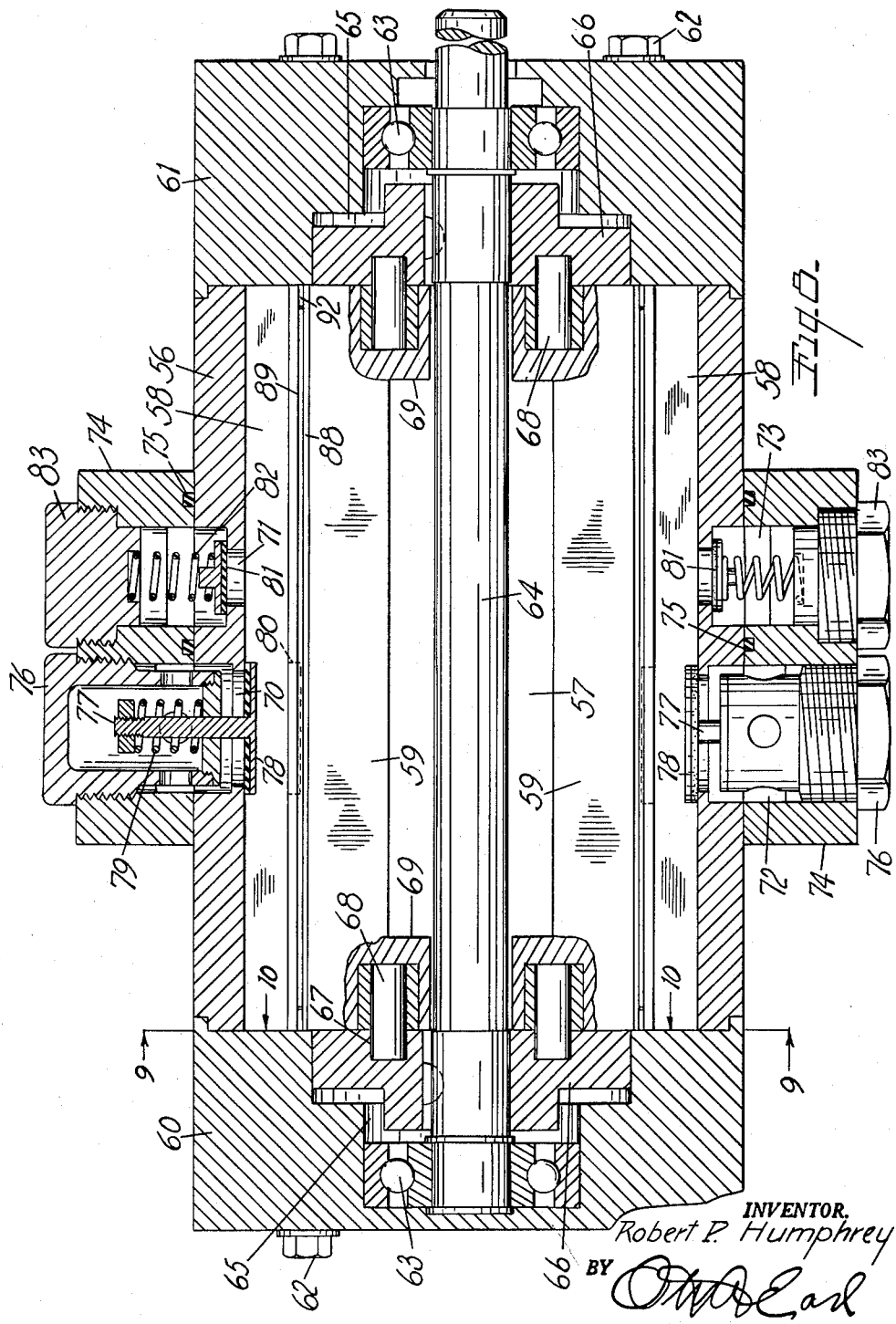

March 16, 1965 R. P. HUMPHREY 3,173,378
MECHANICAL ENERGY TRANSDUCING DEVICE
Filed Dec. 2, 1960 4 Sheets-Sheet 4
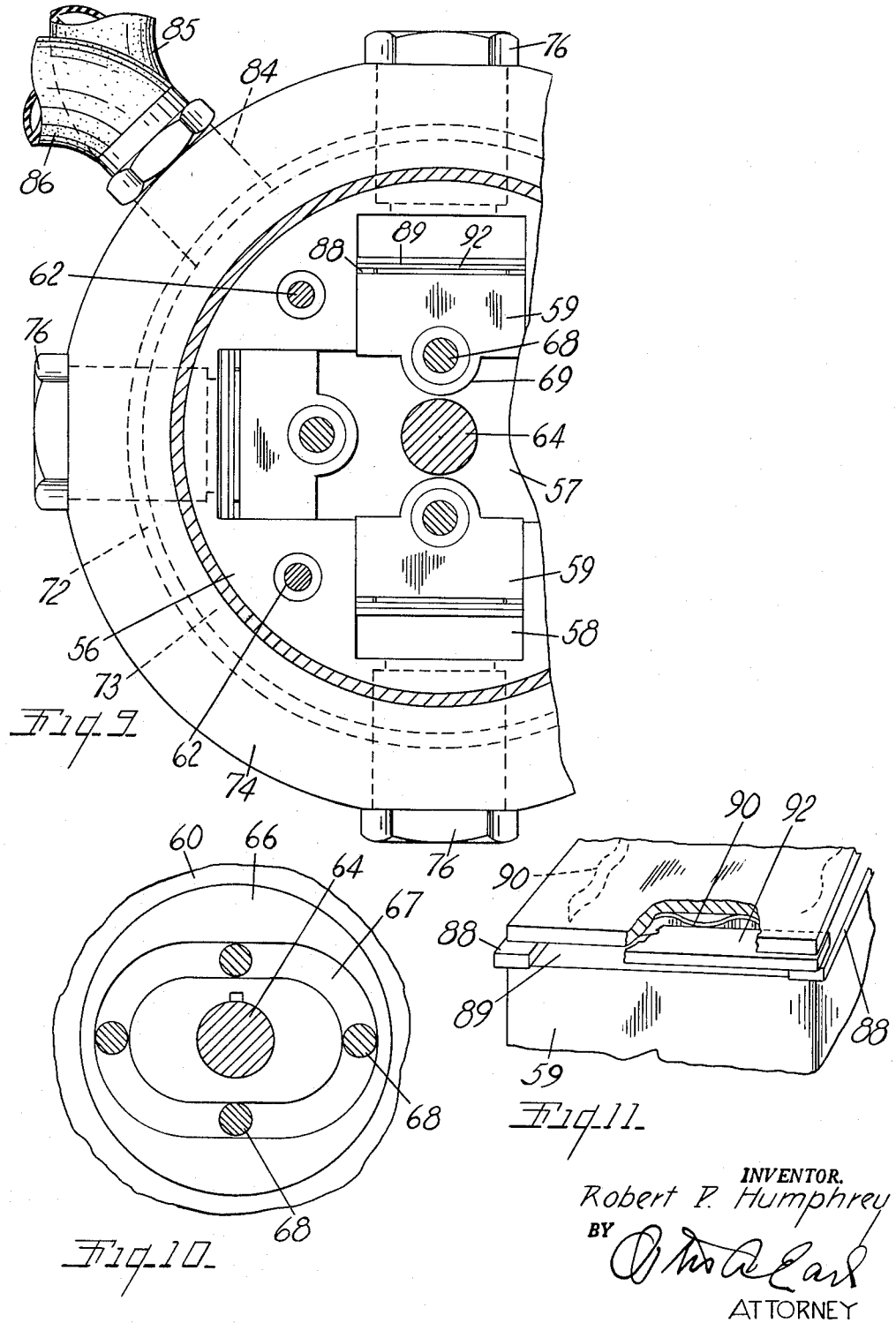
INVENTOR.
Robert P. Humphrey
BY
ATTORNEY

United States Patent Office 3,173,378
Patented Mar. 16, 1965

3,173,378
MECHANICAL ENERGY TRANSDUCING DEVICE
Robert P. Humphrey, Kalamazoo, Mich., assignor to General Gas Light Company, Kalamazoo, Mich.
Filed Dec. 2, 1960, Ser. No. 73,442
5 Claims. (Cl. 103—174)

This invention relates to improvements in a mechanical energy transducing device. The principal objects of this invention are:

First, to provide a novel form of mechanism for transducing mechanical energy between rotative force and gaseous or fluid pressure in which the pressure reaction elements and chambers are of easily manufactured elongated rectangular shape so that the capacity of the device may be easily varied by simply changing the length of the primary elements of the device.

Second, to provide a pressure-rotation energy transducing device which can be assembled either as a pressure operated motor or as a motor driven gas compressor in either of which the pressure elements are elongated rigid members of rectangular cross section.

Third, to provide a novel seal for sealing an elongated rectangular pressure element in a rectangular reaction pressure chamber in which the element is reciprocable for transducing energy between pressure in the chamber and mechanical movement of the pressure element.

Fourth, to provide a novel arrangement of plural elongated rectangular pressure elements arranged in angularly spaced relation about an axis parallel to the elements with chamber forming means positioned around the pressure elements whereby a maximum volume of operative pressure space may be enclosed in a gas engine volume with cam means connecting the pressure elements to a rotating part so that reciprocating motion of the elongated pressure elements perpendicular to their axis is converted directly to rotating energy in a part rotating about an axis central to the several pressure elements.

Fifth, to provide a novel form of valve mechanism for controlling the entry and exit of fluid pressure from a plurality of pressure chambers arranged radially around a central axis whereby cams driven by a shaft located at the central axis may be positioned closely together axially of the shaft to actuate both inlet and outlet valves for each pressure chamber.

Sixth, to provide an energy transducing device which can be manufactured either as a motor or as a compressor with a minimum of parts that are easily fabricated to the required tolerances for an efficient device.

Seventh, to provide a pressure-energy transducing device which is inherently balanced in rotation and which can be manufactured in varying lengths to vary the capacity without changing the longitudinal shape or cross section of any of the parts.

Other objects and advantages of the invention will be apparently from a consideration of the following description and claims. The drawings, of which there are four sheets, illustrate two highly practical forms of the transducing device, one arranged as a compressor and the other arranged as a pressure operated motor.

FIG. 1 is a fragmentary longitudinal cross sectional view through a gas operated motor embodying the primary features of the invention.

FIG. 2 is a cross sectional view taken along the plane of the line 2—2 in FIG. 1 and showing the pressure elements and reaction chambers in end elevation.

FIG. 3 is a fragmentary cross sectional view taken along the plane of the line 3—3 in FIG. 1 and illustrating the arrangement of the valve chambers and mechanism of the motor, certain of the valve mechanisms being omitted to better illustrate the details of the valve mechanism.

FIG. 4 is a transverse cross sectional view through one of the pressure elements taken along the plane of the line 4—4 in FIG. 1.

FIG. 5 is an enlarged end elevational view of the valve operating cam shown in FIGS. 1 and 3. The cam is viewed at about an 180° rotated position from FIG. 3.

FIG. 6 is an edge elevational view of the cam.

FIG. 7 is an exploded elevational view of the elements of the valve assembly shown in FIG. 3.

FIG. 8 is a fragmentary longitudinal cross sectional view through a modified form of the transducing device arranged as a gas compressor or pump.

FIG. 9 is a fragmentary transverse cross sectional view taken along the plane of the line 9—9 in FIG. 8.

FIG. 10 is a fragmentary cross sectional view taken along the plane of the line 10—10 in FIG. 8 and looking in the direction of the arrows.

FIG. 11 is a fragmentary persective view of one of the pressure elements partially broken away to show the sealing blades.

The motor form of the transducer shown in FIGS. 1 to 7 consists of an elongated cylindrical body member 1 with a valve housing and end member 2 secured to one end thereof and a second end member 3 secured to the other end thereof. The end members 2 and 3 support bearings 4 and 5 respectively for an output shaft 6 which is driven by the motor. A cup shaped cover member 7 encloses the valve body and member 2 and coacts therewith to form a central exhaust chamber 8 and surrounding annular inlet chamber 9. A pressure inlet port 10 is adapted to be connected to a suitable source of high pressure fluid such as an air compressor while the exhaust port 11 may be connected to an exhaust duct or merely left open to exhaust to the atmosphere. An annular cylindrical flange 12 on the end of the end member 2 carries a flexible O-ring seal 13 which seals against the inner end of the cover member 7 to separate the inlet chamber 9 from the exhaust chamber 8. The cylindrical side walls 14 of the cover 7 telescopically embody the periphery of the valve body 2 and the end of the main motor body 1 and O-ring seals 15 prevent the escape of pressure along the joint between these members.

The interior of the cylindrical body member 1 defines a central cylindrical passage 16 extended axially through the body and through which the shaft 6 extends. A plurality of parallel elongated pressure chambers 17 of rectangular cross section extend axially through the body member 1 and open radially at their inner sides to the passage 16. The construction of the body member 1 and the passage and chambers therein is such that the member can be conveniently and accurately formed by a process of extruding aluminum and the extrusion can obviously be of any desired length. Positioned within each of the pressure chambers 17 is an elongated pressure responsive element 18 of rectangular cross section sized to fit slidably within the pressure chamber and coextensive in length with the pressure chamber. In order to maintain an effective seal between the pressure element and the walls of its pressure chamber a flexible sealing pad 19 of rubber or similar deformable material is bonded to the outer face of the pressure member. As appears clearly from FIG. 4 the pad 19 is moulded with a peripheral groove 20 formed completely therearound adjacent its periphery to form a thin flexible sealing lip 21 which deflects outwardly under pressure to tightly seal against all surfaces of the chamber 17. The pressure elements 18 which are rigid enough to stand the pressures applied thereto can be easily extruded or machined in long lengths and cut to fit the length of the pressure chamber. The sealing pads 19 must be moulded or otherwise formed to the desired length and are preferably bonded to the outer face of the pressure member.

Near its ends each pressure member 18 is transversely slotted from the inner side as at 22 and pins 23 are extended across the slot to support rollers 24 for supporting the ends of the pressure element and transmitting force from the pressure element to the shaft 6. The forces developed in the pressure elements at 18 are transmitted through the rollers 24 to eccentric cams 25 keyed to the shaft 6 by keys 26 opposite the ends of the pressure elements. The members 251 also keyed to the shaft are eccentric counterweights balancing the cams 25. The forces developed in the pressure elements are thus transmitted to the shaft at spaced points and the pressure elements are conversely supported at their ends for stability and distribution of the loads developed therein. As the eccentrics 25 rotate with the shaft 6, the throw of the eccentric advances progressively into engagement with the rollers 24 of the several pressure elements so that the pressure elements reciprocate radially of the body 1 in the pressure chambers 17 to impart rotary driving force to the eccentrics and the shaft.

In order to properly time the admission of fluid pressure to the several pressure chambers 17 and the subsequent exhaust of spent gases from each chamber, the valve body end member 2 is provided with a plurality of radially extending valve cavities 27 corresponding to the pressure chambers 17 and each cavity communicates through a radially outwardly inclined port 28 to the inner end face of the end member which communicate with a beveled end surface 29 of the pressure chamber. The lower or radially inner ends of the cavities 27 communicate through inwardly directed ports 30 with an internal recess 31 in the end member. This recess 31 communicates, as will be described presently, with the exhaust chamber 8. Each cavity 27 receives a generally cylindrical valve cage 32 with O-ring seals 33 around its ends which seal the cage in the cavity. Locating set screws 34 position the cage in the cavity and prevent rotation of the cage. The inner side of the cage is transversely cut away as at 35 to register with the inlet port 28. The ends of the cage are oppositely inwardly beveled to form an inlet valve seat at 36 and an outlet valve seat at 37.

The valve mechanism positioned within each cage consists of a radially inner outlet valve 38 having a tubular stem 39 and a radially outwardly facing tapered face 40 that is desirably formed of rubber or other deformable material bonded to the end of the valve. The face 40 is sized to seat against the outlet valve seat 37. The inlet valve 41 has a radially inwardly projecting elongated valve stem 42 that projects through the bore 43 in the outlet valve stem and the inner face of the valve 41 is faced as at 44 with an inwardly tapered deformable facing to seat inwardly against the inlet valve seat 36.

Keyed to the shaft 6 at the inner ends of the several valve stems 39 and 42 is a double contoured cam disc 45 secured in place by the nut 46. As appears most clearly from FIGS. 5 and 6 the cam 45 has identically contoured end portions 47 separated by a central cam contour 48. The central contour 48 is sized and positioned to coact with the inwardly projecting ends of the inlet valve stems 42 while the end contours 47 coact with and support the inner end of the valve stem 39 of the outlet valve 38. Both the central and end cam contours have a coincident inner arcuate portion 49 that extends for approximately 125° around the circumference of the cams and when these portions are in contact with the valve stems the exhaust valves 38 will be open and the inlet valves 41 will be closed. Following the retracted inner portions 49, the end cams 47 and 48 taper outwardly in beveled lift portions 50 through approximately 30° of rotation of the cam disc to smoothly close the exhaust valves after which an elongated raised dwell 51 extending through approximately 180° of cam contour keep the exhaust valves closed. The central cam portion 48 continues through approximately 30° of retracted surface at 52 after the exhaust valve starts to close, and upon completion of the closing motion of the exhaust valve, rises along the beveled rise 53 to lift the stem 42 and open the inlet valves 41. The inlet valves are held open through approximately 130° of rotation and then start closing along the receding cam face 54 so as to be completely closed approximately 5° before the receding cam faces 55 on the end cam portions open the exhaust valves. This particular cam contour has been found to be particularly effective and to produce an efficient air motor when five equally spaced pressure chambers and pressure elements are used as illustrated. The cam contours may be varied somewhat and will, of course, change materially if the number of chambers in the motor is changed.

The air or gases exhausted into the internal chamber 31 in the end member 2 communicate with the central passage 16 in the body 1 around the eccentric 25 and flow through the central passage to a similar internal recess 31A in the end member 3. In so doing the exhaust air acts as a coolant on the inner sides of the pressure elements 18. From the inner chamber 31A in the end member 3, the exhaust air is directed through enlarged bores 131 in the body member and registering bores 132 in the end member 2 to inwardly inclined ports 133 which open into the previously described exhaust chamber 8. The bores 131 and 132 are spaced angularly around the body and the end members between the pressure chambers 17 and pass elongated through bolts 134 which serve to clamp the body 1, end members 2 and 3 and cover member 7 axially together.

Starting with the structure in the position shown in FIGS. 1 and 5, rotation of the shaft 6 and cam 45 in a clockwise direction will first move the inlet valve 41 outwardly while holding the exhaust valve 38 in outward closed position. Air pressure is then admitted through the port 10 past the valve 41 and into the sleeve 32 from where it flows through the slot 35 and port 28 to the upper pressure chamber at the outer side of the pressure element 18. This forces the pressure element inwardly applying torsional force through the rollers 24 to the eccentrics 25 and shaft 6 rotating the shaft and the valve cam 45. The inlet valve is closed by engagement with the receding surface 54 prior to opening of the exhaust valve so that there is a period or cycle for the compressed fluid to expand in working relation to the pressure element. Continued rotation of the shaft and valve cam brings the retracting surfaces 55 into engagement with the cylindrical inner end of the exhaust valve 40 opening the exhaust valve so that upward or radially outward motion of the pressure element by eccentrics 25 is effected without compression in the pressure chamber. Fluid in the chamber is forced freely outwardly through the port 28 and valve sleeve 32 from where it flows over the outlet valve 40 to the passage 30 opening to the inside of the body around the shaft 6. The exhaust gases flow in cooling relation across the inner side of the pressure element to the cavity or recess 31A from where it flows into the several bores 131 in the body and travels therealong around the bolts 134 to the ports 133 and the exhaust port 11.

The modified form of the transducing device shown in FIGS. 8 to 11 is designed primarily for use as a compressor and hence has certain different arrangements of valves and driving cams. However, the device includes an elongated tubular body member 56 having a central passage 57 therethrough and having a plurality of radially inwardly facing pressure chambers 58 formed therein and opening to the passage 57. The chambers 58 are of generally rectangular cross section with parallel side walls for slidably and sealingly receiving the elongated rectangular rigid pressure elements 59. In the example illustrated, the chambers 58 and pressure elements 59 are arranged in two opposed pairs. End caps 60 and 61 are secured to the ends of the body by screws 62 passed through the body between the pressure chambers and the end members carry bearings 63 rotatably supporting the shaft 64. The end members 60 and 61 each have recesses 65 formed in their inner faces which receive eccentric crank or cam members 66 which are keyed to the shaft for rotation therewith. The cam members 66 define oval shaped box cam grooves 67 faced axially inwardly toward the body member 56 and drivingly receive the ends of drive pins 68 rotatably mounted in the ends of the pressure elements 59. To accommodate the drive pins 68 the ends of the pressure elements are provided with radially inwardly projecting extensions 69.

From the foregoing description it will be apparent that rotation of the shaft 64 and the connected cam or crank elements 66 will cause the connecting pins 68 engaged in the boss cams 67 to move radially inwardly and outwardly in opposed pairs to provide a pumping action in the several pressure chambers 58.

The valving for the compressor shown in FIGS. 8 to 10 differs from the valving of the motor in that simple check valves can be employed. Each pressure chamber 58 is provided with an inlet port 70 and an outlet port 71 formed through the outer wall of the body 56 centrally of the pressure chamber. The several inlet ports are interconnected and the several outlet ports are interconnected by an annular inlet manifold passage 72 and an annular outlet passage 73 formed around the inside of a valve ring 74 positioned around the outside of the body 56. O-ring seals 75 seal the ring to the body on both sides of the outlet manifold. An inlet valve cage 76 is threaded into the valve ring opposite each inlet port 70 and carries the stem 77 of a valve having an inner head 78 seating outwardly against the inner edge of the inlet port 70.

A spring 79 biases the valve to closed position and if necessary to provide clearance on the compression stroke, the face of the pressure element 59 may be recessed as at 80 to receive the head 78. The outlet valve 81 naturally seats oppositely inwardly against the outer side of the outlet port 71 and is biased to closed position by a spring 82 backed up by a plug 83. The ring 74 has threaded connections 84 for connection of the output pipe 85 delivering from the compressor and if desired an inlet pipe 86 (see FIG. 9). As will be apparent rotation of the shaft 64 by a driving means causes opposed pairs of pressure elements 59 to first draw in a charge of the gas to be compressed through the inlet valves 79 and to subsequently compress and eject the charge through the exhaust valves 81. While one opposed pair of pressure elements are drawing in low pressure gas, the other opposed pair of pressure elements are compressing and ejecting charges of compressed gas so the compressor is inherently in balance. The capacity of the compressor is easily varied by changing the length of the body 56 and a maximum amount of compression space can be included within any given diameter of the tubular body 56.

As appears most clearly from FIG. 11, the pressure elements 59 have peripheral groves 89 in which are fitted metallic seal blades 88 and 92 that overlap at the corners of the pressure elements. The blades 88 and 92 are urged outwardly of the slots by sinuously curved backing springs 90 to keep the edges of the blades in sealing contact with the side and end walls of the pressure chambers 58 for efficient pumping action.

What is claimed as new is:

1. An energy transducing device having a body and a a shaft extending relatively rotatably through a passage therethrough, said body having angularly spaced pressure chambers formed therein opening radially inwardly to the shaft with radially reciprocable rigid pressure elements in said chambers in thrust transmitting relation to eccentrics on said shaft, and valve means carried by said body arranged to control the admission and exhaust of fluid to and from said chambers, characterized by said body having an axially elongated integral center portion with said chambers and said pressure elements being elongated axially of said shaft and of rectangular shape extending from end to end of said center portion, end members secured to the ends of said center portion across the ends of said chambers and in contact with the ends of said elements, said valve means being positioned in one of said end members and actuated by rotation of said shaft, said valve means includes exhaust valves discharging axially inwardly to said passage in said body, the other of said end members defining an internal recess communicating with said body passage and angularly spaced bolt holes through said body, through bolts extending through said bolt holes in spaced relation to the walls of the holes and clamping said end members to said body, and exhaust ports formed in said one end member from the ends of said bolt holes.

2. A device as claimed in claim 1 in which said valve means includes means forming radially extending valve cavities with radially inner and outer coaxial seats and with ports opening from each cavity between the seats thereof to one of said pressure chambers, radially inner valves coacting with said inner seats and having inwardly projecting tubular stems, and outer valves coacting with said outer seats and having inwardly projecting stems extending through said tubular stems, and cams on said shaft positioned side by side to coact with the tubular stems and the other stems projecting therethrough.

3. A device as claimed in claim 1 in which said valve means includes means forming radially extending valve cavities each with an outwardly facing seat at the outer end thereof and a coaxial inwardly facing seat at the inner end thereof and with a port opening from between said seats to one of said pressure chambers, an exhaust valve having an inwardly extending tubular stem coacting with said outlet ports, and an inlet valve coacting with said inlet port and having an elongated stem projecting inwardly through the tubular stem of said exhaust valve, and cams on said shaft positioned side by side to coact with said stems.

4. A device as claimed in claim 3 in which said exhaust valve seats communicate with ports directed axially inwardly to the passage in said body to circulate exhaust gases in heat transfer relation to the insides of said pressure elements.

5. An energy transducing device having a body and a shaft extending relatively rotatably through a passage therethrough, said body having angularly spaced pressure chambers formed therein opening radially inwardly to said shaft with radially reciprocable rigid pressure elements in said chambers in thrust transmitting relation to eccentrics on said shaft, and valve means carried by said body arranged to control the admission and exhaust of fluid to and from said chambers, characterized by said body having an axially elongated integral center portion with said chambers and said pressure elements being elongated axially of said shaft and of rectangular shape extending from end to end of said center portion, end members secured to the ends of said center portion across the ends of said chambers and in contact with the ends of said elements, said eccentrics being positioned axially inwardly of said end members adjacent each end of said pressure elements, valve means being positioned in one of said end members and actuated by rotation of said shaft, said valve means including exhaust valves discharging axially inwardly through said passage in said body to cool the interior of said pressure elements.

(References on following page)

References Cited in the file of this patent

UNITED STATES PATENTS

| | | |
|---|---|---|
| 1,924,423 | Svenson | Aug. 29, 1933 |
| 1,964,245 | Benedek et al. | June 26, 1934 |
| 2,545,774 | Griswold | Mar. 20, 1951 |
| 2,660,365 | Paget | Nov. 24, 1953 |
| 2,712,301 | Gravely et al. | July 5, 1955 |
| 2,738,122 | Gardiner | Mar. 13, 1956 |
| 2,754,164 | Schwartz | July 10, 1956 |
| 2,871,846 | Zimmerman | Feb. 3, 1959 |
| 2,974,599 | Dolza | Mar. 14, 1961 |
| 3,002,462 | Raymond | Oct. 3, 1961 |
| 3,004,493 | Porkert | Oct. 17, 1961 |
| 3,064,430 | Reynolds | Nov. 20, 1962 |

FOREIGN PATENTS

| | | |
|---|---|---|
| 453,565 | Canada | Dec. 21, 1948 |
| 453,914 | Canada | Jan. 4, 1949 |
| 854,892 | Germany | Sept. 4, 1952 |